United States Patent
Dominguez (10) Patent No.: US 12,227,915 B2
(45) Date of Patent: Feb. 18, 2025

(54) SYSTEM AND METHOD FOR IMPROVED SCREW PILE BASE

(71) Applicant: Eddy Dominguez, Milpitas, CA (US)

(72) Inventor: Eddy Dominguez, Milpitas, CA (US)

(73) Assignee: InfraCom Inc., Fremont, CA (US)

( * ) Notice: Subject to any disclaimer, the term of this patent is extended or adjusted under 35 U.S.C. 154(b) by 0 days.

(21) Appl. No.: 18/589,829

(22) Filed: Feb. 28, 2024

(65) Prior Publication Data

US 2024/0200300 A1 Jun. 20, 2024

Related U.S. Application Data (63) Continuation-in-part of application No. 18/215,915, filed on Jun. 29, 2023, now Pat. No. 11,939,783.

(60) Provisional application No. 63/356,567, filed on Jun. 29, 2022.

(51) Int. Cl.
*E02D 5/56* (2006.01)
*E02D 7/22* (2006.01)
*E02D 27/12* (2006.01)
*E02D 27/42* (2006.01)

(52) U.S. Cl.
CPC ............. *E02D 5/56* (2013.01); *E02D 7/22* (2013.01); *E02D 27/12* (2013.01); *E02D 27/42* (2013.01); *E02D 2200/1671* (2013.01)

(58) Field of Classification Search
CPC ... E02D 5/56; E02D 27/42; E02D 2200/1671; E02D 7/22; E02D 27/12; F03D 13/22
USPC .......................................................... 52/848
See application file for complete search history.

(56) References Cited

U.S. PATENT DOCUMENTS

| | | |
|---|---|---|
| 4,359,356 A | 11/1982 | Kornbichler et al. |
| 4,772,352 A | 9/1988 | Kornbichler |
| 4,911,580 A * | 3/1990 | Gregory ............ E02D 35/00 405/230 |
| RE35,081 E | 11/1995 | Quigley |

(Continued)

FOREIGN PATENT DOCUMENTS

| | | |
|---|---|---|
| CN | 104626602 A | 5/2015 |
| CN | 106049960 A | 10/2016 |

OTHER PUBLICATIONS

"Mandrel Filament Moulding of carbon masts," youtube.com. https://www.youtube.com/watch?v=IE1T81Jx3aA [Date accessed: Apr. 29, 2022].

(Continued)

*Primary Examiner* — Brent W Herring
(74) *Attorney, Agent, or Firm* — Bold IP PLLC; Christopher Mayle (57) ABSTRACT

A carbon fiber structure that achieves the strength and durability of steel tower alternatives at 90% less weight and a lower total installed cost. The mass production process provides affordable carbon fiber telecommunication towers that are engineered for peak strength to weight performance. The composite non-corrosive, non-rusting towers are easy to install and transport to remote locations and have lower maintenance than alternatives. The tapered monopole series provides a wide array of tower options that are all engineered for unparalleled strength to weight characteristics. The carbon fiber structures provide an aesthetical, lightweight, minimum base width, that are transportation friendly with sections that can be nested inside themselves to optimize.

7 Claims, 6 Drawing Sheets

(56) References Cited

U.S. PATENT DOCUMENTS

| | | | |
|---|---|---|---|
| 5,513,477 A | 5/1996 | Farber | |
| 5,722,798 A * | 3/1998 | Gregory | E04G 23/065 |
| | | | 254/133 R |
| 5,779,838 A | 7/1998 | Fellers et al. | |
| 5,951,206 A * | 9/1999 | Gregory | E02D 35/00 |
| | | | 405/230 |
| 5,980,162 A * | 11/1999 | McCown | E02D 27/34 |
| | | | 405/251 |
| 6,453,635 B1 | 9/2002 | Turner | |
| 6,468,002 B1 * | 10/2002 | Gregory | E02D 35/00 |
| | | | 405/230 |
| 6,514,012 B2 * | 2/2003 | Gregory | E02D 35/00 |
| | | | 405/230 |
| 6,540,171 B2 | 4/2003 | Yasui et al. | |
| 6,955,024 B2 | 10/2005 | Ashton | |
| 7,004,683 B1 * | 2/2006 | Rupiper | E02D 5/56 |
| | | | 52/165 |
| 7,098,864 B2 | 8/2006 | Ryan | |
| 7,547,371 B2 | 6/2009 | Christensen | |
| 7,607,865 B2 * | 10/2009 | Gregory | E02D 27/12 |
| | | | 405/253 |
| 7,628,869 B2 | 12/2009 | Martin et al. | |
| 7,866,121 B2 | 1/2011 | Polyzois et al. | |
| 8,228,259 B2 | 7/2012 | Hager | |
| 9,499,954 B2 * | 11/2016 | Shi | E02D 27/02 |
| 9,651,029 B2 | 5/2017 | Hayden et al. | |
| 9,745,750 B2 | 8/2017 | Holmes | |
| 10,731,372 B1 | 8/2020 | Nolen et al. | |
| 2002/0076281 A1 * | 6/2002 | Gregory | E02D 35/00 |
| | | | 405/229 |
| 2006/0127188 A1 * | 6/2006 | Francis | E02D 5/56 |
| | | | 405/231 |
| 2008/0087371 A1 | 4/2008 | Friedrich et al. | |
| 2008/0184654 A1 | 8/2008 | Polyzois et al. | |
| 2008/0274319 A1 | 11/2008 | Berksoy et al. | |
| 2009/0211173 A1 | 8/2009 | Willey et al. | |
| 2009/0266004 A1 | 10/2009 | Willey et al. | |
| 2009/0324951 A1 | 12/2009 | Castellani et al. | |
| 2010/0129162 A1 * | 5/2010 | Kristensen | E02B 17/0034 |
| | | | 290/55 |
| 2010/0257794 A1 * | 10/2010 | Stark | E02D 5/80 |
| | | | 52/165 |
| 2011/0281082 A1 | 11/2011 | Wilson | |
| 2013/0243989 A1 | 9/2013 | Ridges et al. | |
| 2014/0115978 A1 * | 5/2014 | Fairbairn | H01Q 1/12 |
| | | | 52/298 |
| 2015/0159635 A1 | 6/2015 | Hayden et al. | |
| 2016/0230365 A1 * | 8/2016 | Shi | E02D 27/42 |
| 2016/0251818 A1 * | 9/2016 | Thomsen | E02D 27/425 |
| | | | 52/297 |
| 2016/0333540 A1 * | 11/2016 | Kaufman | E02D 27/48 |
| 2017/0030045 A1 * | 2/2017 | Krause | E04H 12/2269 |
| 2018/0016807 A1 | 1/2018 | Chronis | |
| 2019/0119938 A1 | 4/2019 | Sorenson et al. | |
| 2020/0140631 A1 | 5/2020 | Sorenson | |
| 2021/0222677 A1 * | 7/2021 | Stecher | F03D 13/22 |
| 2021/0404205 A1 | 12/2021 | Elliott et al. | |
| 2022/0145573 A1 * | 5/2022 | Schuldt | E02D 27/016 |

OTHER PUBLICATIONS

"Isotruss carbon fiber cell towers support global demand for 5G telecom rollout," compositesworld.com. https://www.compositesworld.com/news/isotruss-carbon-fiber-cell-towers-support-global-demand-for-5g-telecom-rollout [Date accessed: Apr. 29, 2022].

"Obelisk Composite Technology," obeliskcomposite.com. http://obeliskcomposite.com/ [Date accessed: Apr. 29, 2022].

* cited by examiner

SYSTEM AND METHOD FOR IMPROVED SCREW PILE BASE

CROSS REFERENCE TO RELATED APPLICATIONS

This application claims priority to U.S. Non-Provisional patent application Ser. No. 18/215,915, filed on Jun. 29, 2023, which claims priority to U.S. Provisional patent application Ser. No. 63/356,567, filed on Jun. 29, 2022, which are incorporated in their entirety.

FIELD OF THE DISCLOSURE

The overall field of this invention relates to telecommunications towers, and more particularly to a screw pile base, for use in systems and methods for the construction of telecommunications towers in smaller areas to minimize the footprint needed to construct a larger sized tower.

BACKGROUND

Telecommunications towers are where electronic communications equipment and antennae are mounted, allowing the surrounding area to use wireless communication devices like telephones and radios. Prevailing technology for telecommunications towers, whether self-supported or guyed, are typically steel or concrete constructions typically requiring a screw pile base, also known as a helical pile or screw anchor, that is used as a foundation. To achieve higher load-bearing capacity, larger helical plates and longer shafts are used to increase the contact area with the soil and reach deeper, more stable soil layers. However, this requires a larger footprint that is not suitable for smaller areas and thus a system and method for a new design of screw pile is needed.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

SUMMARY

The present invention provides a unique carbon fiber structure that achieves the strength and durability of steel tower alternatives at 90% less weight and a lower total installed cost. The mass production process provides affordable carbon fiber telecommunication towers that are engineered for peak strength to weight performance. The composite non-corrosive, non-rusting towers are easy to install and transport to remote locations and have lower maintenance than alternatives. The global ecosystem is in favor of light-weight, small carbon footprint, cost-effective towers and our products are the only solution. The tapered monopole series provides a wide array of tower options that are all engineered for unparalleled strength to weight characteristics. The carbon fiber structures provide an aesthetical, lightweight, minimum base width, that are transportation friendly with sections that can be nested inside themselves to optimize transportation and logistical challenges The carbon fiber structures are non-corrosive and last many times longer than steel. The carbon fiber structures are environmentally friendly with virtually no negative environmental impact, markedly lower density and extreme structural weight reduction compared to steel.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

Figure 1:
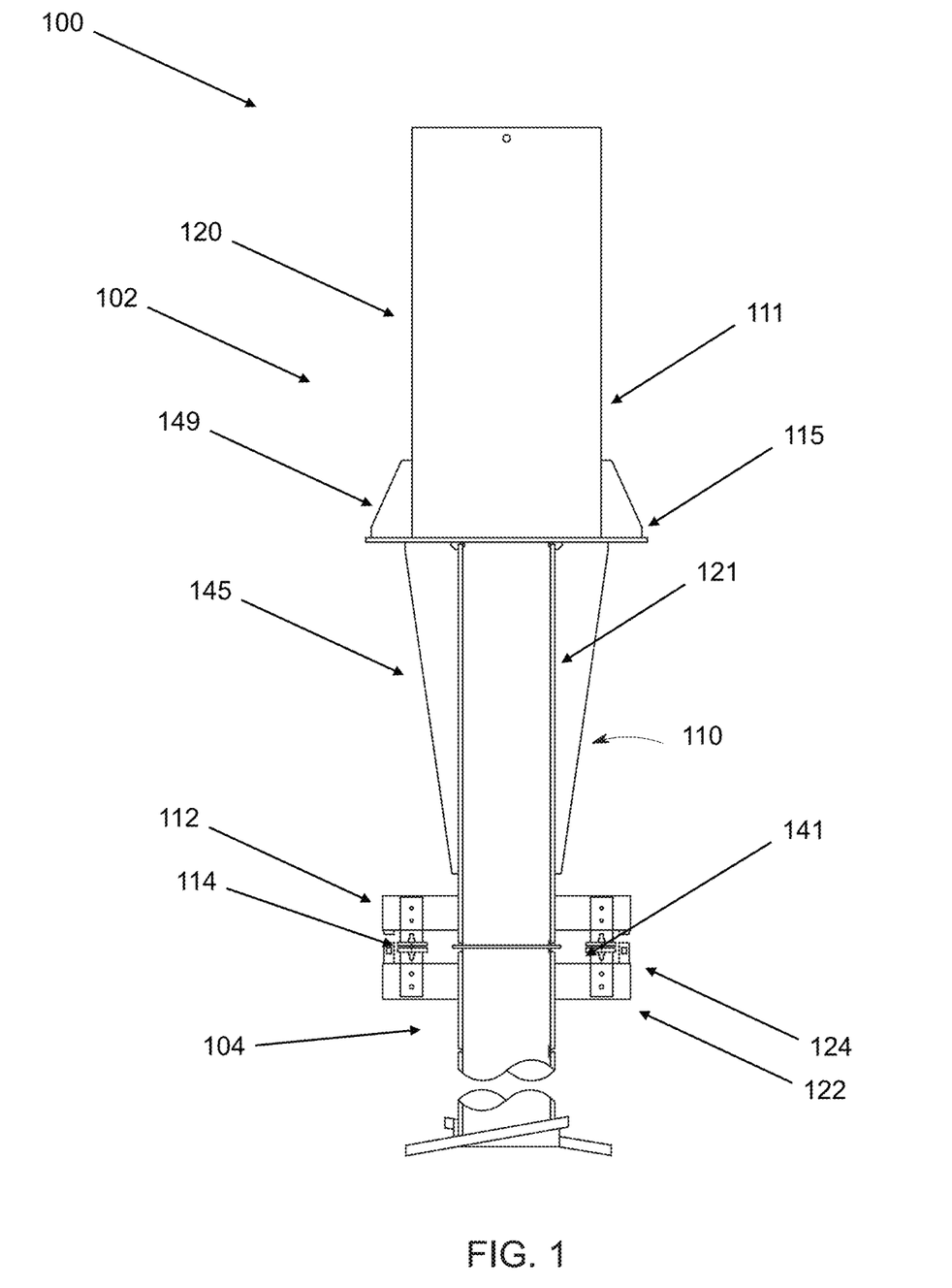
FIG. 1 is a schematic view of a screw pile base for use in the construction of a tower according to one embodiment of the present invention.

With reference to FIG. 1 there is illustrated one possible arrangement of a screw pile base system 100 for use in the construction of a telecommunications tower having a shaft 102 and screw pile connector 104. During installation, a telecommunications tower may be installed in different ways. Telecommunications towers may have a pile that is inserted into the ground and connected to screw pile base system 100. In one or more non-limiting embodiments, the foundation shall be a single pile foundation supported by a bearing layer with an N value of 2 at GL−10.0 m for the purpose of general area application.

The pile construction method may be winged rotary penetrating steel pipe piles (AMZ Method Co., Ltd. Edge). Pile tip ground: N value 2 assumed Bearing capacity of steel pipe pile method AMZ method Pushing direction: Ministry of Land, Infrastructure, Transport and Tourism certified method TACP-0623 (sand/gravel)/TACP-0624 (clay). The pile (A.M.Z pile) used in this construction method has a shape in which two semicircular wings are attached to the tip of a steel pipe (101.6 to 457.2), an assembly plate and an excavation blade are attached.

Shaft 102 may include a lower component 110 which is connected to screw pile connector 104 and an upper component 120 connected to the lower component 110. Lower component 110 may have a support segment or middle platform 115 or area of greater circumference and width than cylindrical first body 111 closer to a top surface of lower component 110 whereby the area acts as a support for upper component 120 to rest upon.

Cylindrical first body 111 may be hollow and is typically constructed from steel of a suitable grade strength. The diameter of lower component 110 may be sized to have a larger diameter than a portion of screw pile connector 104 such that lower component 110 may be positioned over an inner lip 139 extending from base 141 of the screw pile connector on screw pile connector 104 and fastened to it. Screw pile connector 104 may have a base 141 of a larger area of which lower component 110 may be positioned upon.

The cylindrical first body 111 of lower component 110 may be connected to a series of protrusions 112 that extend laterally outward in different directions from four different points on the exterior curved surface of cylindrical first body 111. Protrusions 112 may have one or more mounting or fastening holes. Two of the four protrusions 112 are aligned with one another and perpendicular to the other protrusions 112. Protrusions 112 may be in the shape of a rectangular plank that are connected along a vertical length of cylindrical main body 11. The length that protrusions 112 extend outward from cylindrical first body 111 is greater than that of the length the vertical length. At the end of each protrusion, opposite of cylindrical first body 111 may be a smaller plank 114 that rests upon protrusions 112 whereby smaller planks 114 extends outward in both directions from protrusions 112.

Figure 2:
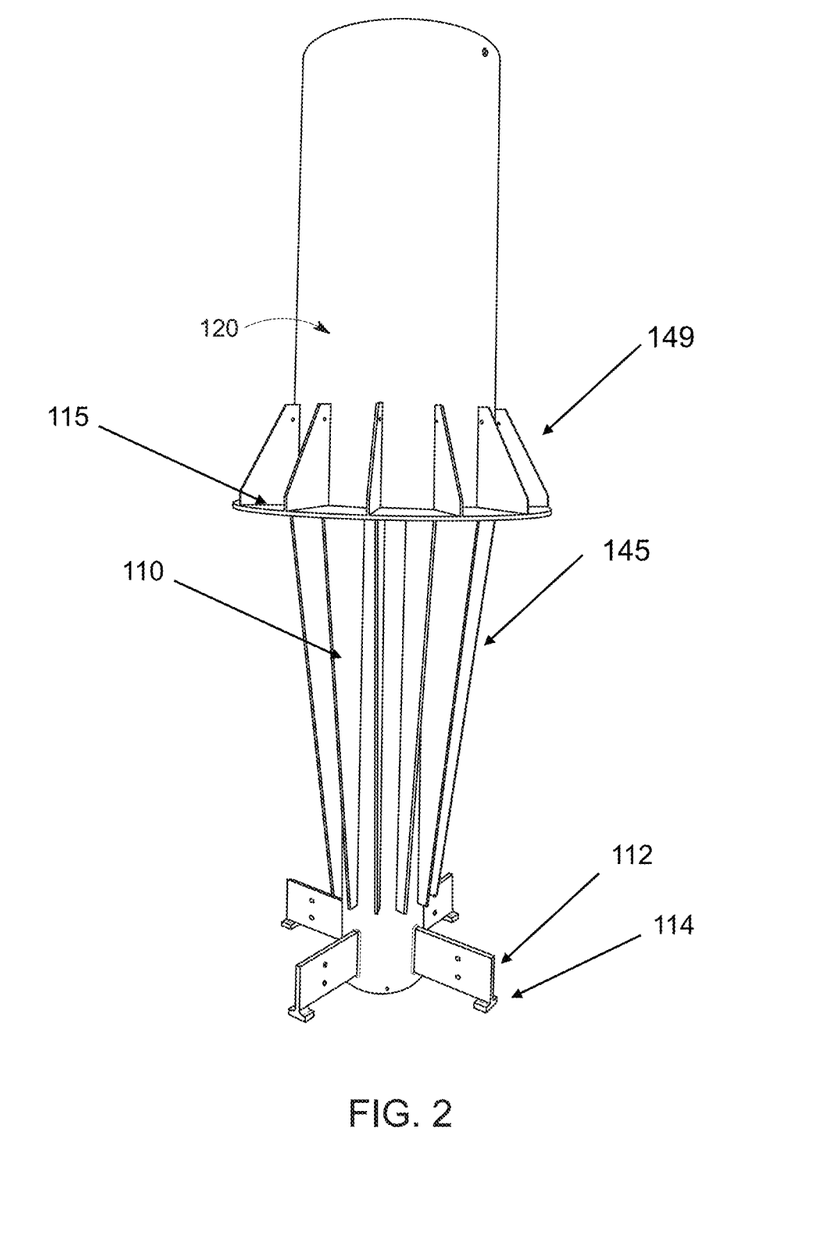
FIG. 2 illustrates another view of the screw pile base.

Lower component 110 may have a series of triangular ridges 145 positioned above protrusions 122 that extend outward from cylindrical first body 111 whereby triangular ridges 145 extend further outward as they move farther from the bottom of lower component 110, as illustrated in FIG. 2.

The top of triangular ridges 145 may be directly connected to a bottom surface of a middle platform 115 that is of greater circumference than the remainder of upper component 120. Upper component 120 may have an upper section with a cylindrical second body 121 that may be positioned to and directly connected to middle platform 115 whereby cylindrical second body 121 is of greater circumference than cylindrical first body 111.

The upper section may have a series of triangular ridges 149 along a perimeter of the cylindrical second body of upper component 120. Triangular ridges 149 may be positioned above and directly connected to a top surface of the middle platform 115 whereby triangular ridges 149 extend inward to the cylindrical second body as they move farther from middle platform 115.

Figure 3:
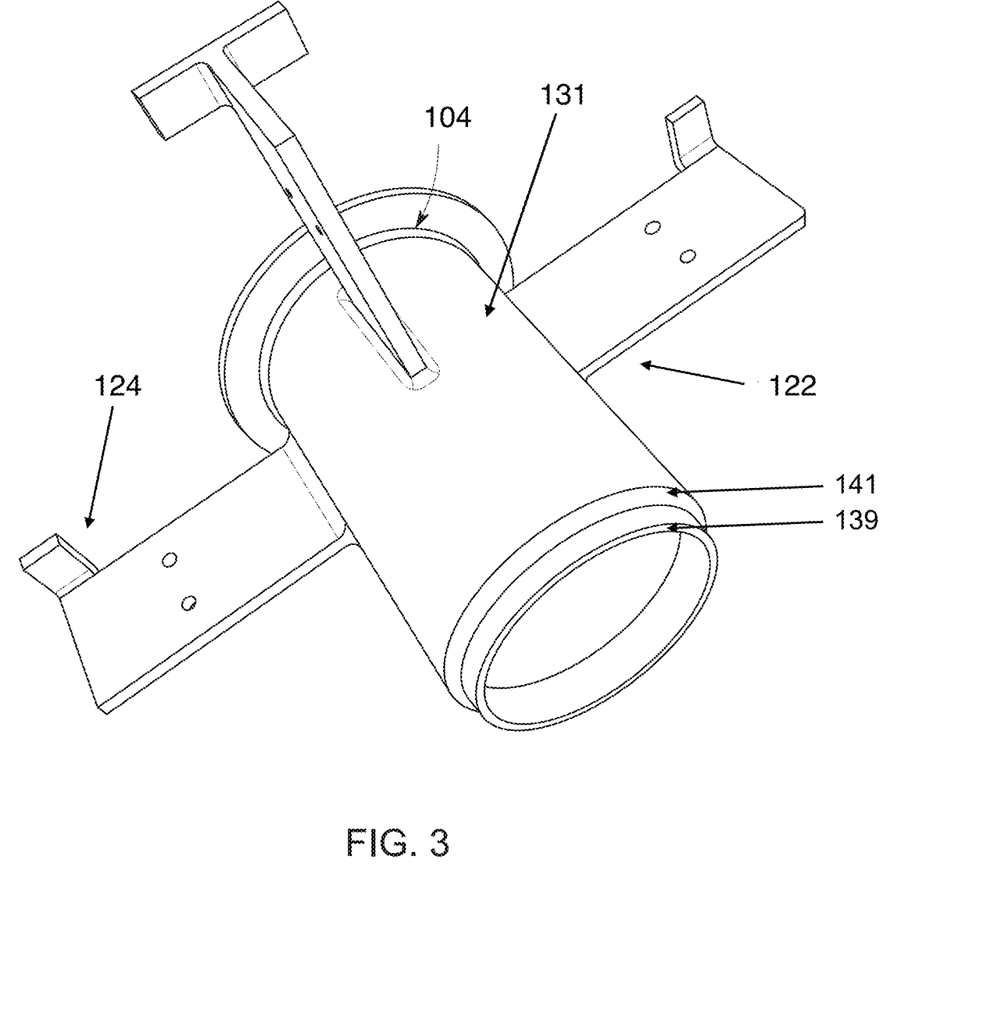
FIG. 3 illustrates another view of the screw pile base.
Figure 4:
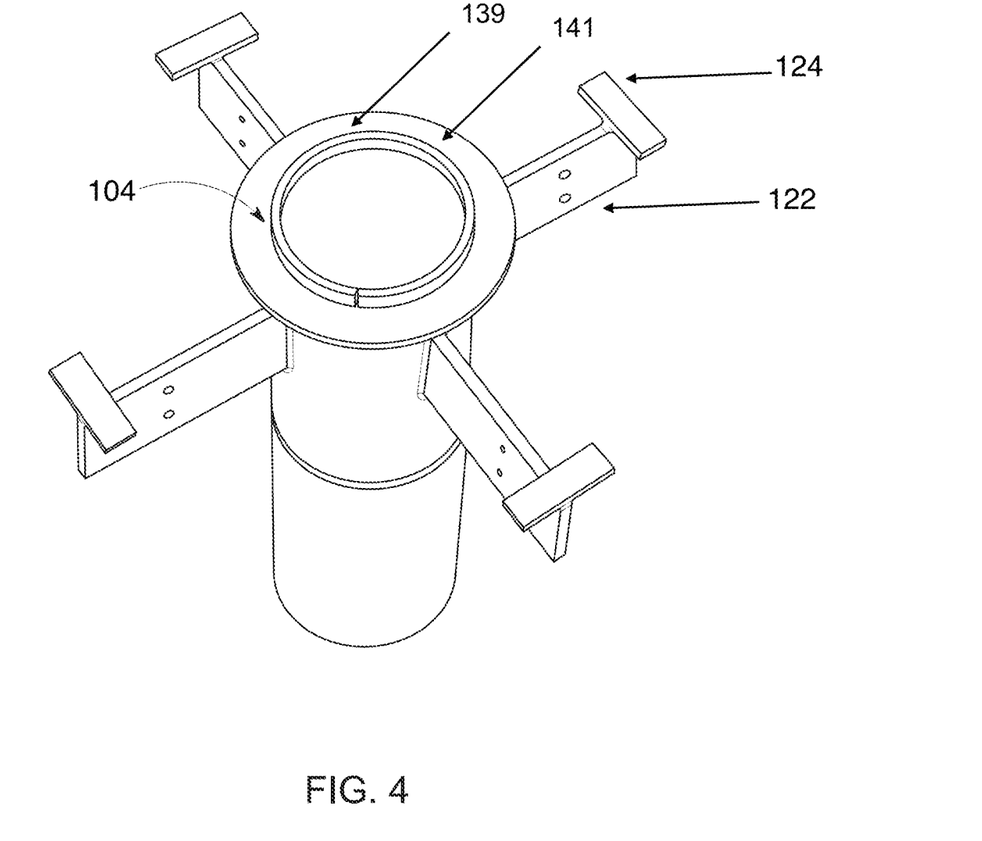
FIG. 4 illustrates another view of the screw pile base.
Figure 5:
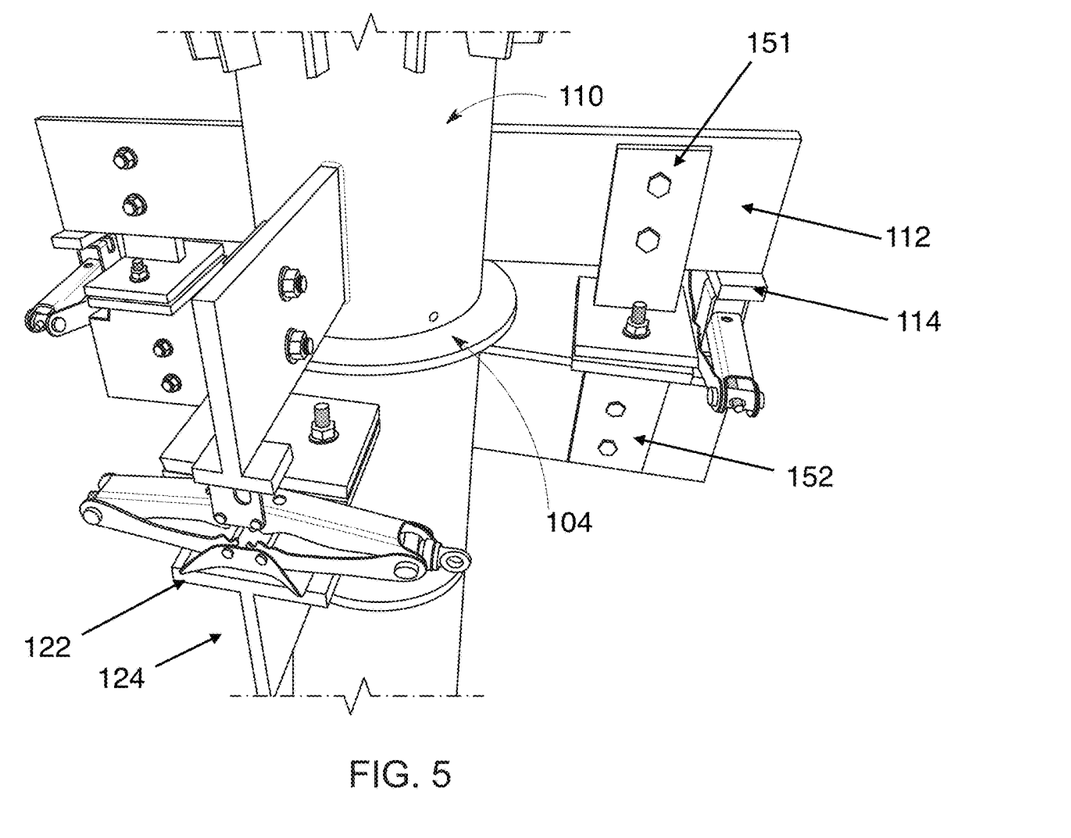
FIG. 5 illustrates another view of the screw pile base.
Figure 6:
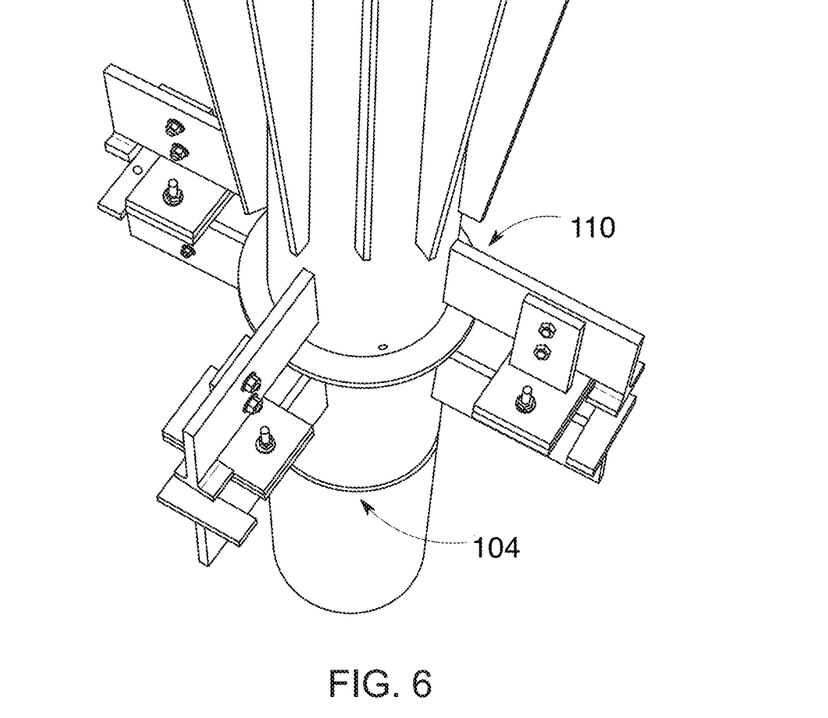
FIG. 6 illustrates another view of the screw pile base

Screw pile connector 104, as illustrated in FIG. 3-6, may have a series of protrusions 122 that extend laterally outward in different directions from four different points on the exterior curved surface 131, as illustrated in FIG. 3, similar to lower component 110 whereby they vertically aligned with the protrusions of lower component 110. Protrusions 122 may have one or more mounting or fastening holes. At the end of each protrusion 122, opposite of the cylindrical first body may be a smaller plank 124 that is positioned below protrusions 122 whereby smaller plank 124 extends outward in both directions from protrusions 122. The protrusions of lower component 110 may be connected to the protrusions of screw pile connector 104 by any number of mounting plates 151 on lower component 110 that extend downward from protrusions 112 between cylindrical second body 121 and planks 114 and directly connect to mounting plates 152 on screw pile connector 104 extending above protrusions 122 between the exterior curved surface and planks 124 or other types of fasteners, as illustrated in FIG. 5.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A screw pile base for larger towers in smaller areas, the screw pile base having a shaft and a screw pile connector, wherein the screw pile connector has a central cylindrical component and four screw pile protrusions that extend outward from the central cylindrical component laterally in four directions, wherein the screw pile connector has planks connected to each of the screw pile protrusions at a top surface of an opposite end of the screw pile protrusions from the central cylindrical component, wherein the planks are perpendicular to the screw pile protrusions, wherein the shaft has a cylindrical body and four shaft first protrusions that extend outward from the cylindrical body laterally in four directions, wherein the shaft has shaft second protrusions connected to each of the four shaft first protrusions at a bottom surface of an opposite end of the shaft first protrusions from the cylindrical body, wherein the second shaft protrusions of the shaft are perpendicular to the first shaft protrusions of the shaft, wherein the shaft has an upper component and a lower component, wherein the upper component is wider than the lower component, wherein the upper component and the lower component are separated by a middle plate.

2. The screw pile base of claim 1, wherein the upper component has a series of triangular ridges extending inward and upward directly from a top of the middle plate.

3. The screw pile base of claim 2, wherein the lower component has a series of second triangular ridges extending inward and downward directly from a bottom of the middle plate in an opposite direction from the series of triangular ridges.

4. A screw pile base for larger towers in smaller areas, the screw pile base having a shaft and a screw pile connector, wherein the screw pile connector has a central cylindrical component and four screw pile connector protrusions that extend laterally outward from the central cylindrical component, wherein the screw pile connector has screw pile connector planks connected to the screw pile connector protrusions at a top surface of a distal end of the screw pile connector protrusions, wherein the shaft has a cylindrical body with shaft protrusions that extend laterally outward from the cylindrical body, wherein the shaft protrusions are connected to shaft planks at a bottom surface of a distal end of the shaft protrusions, wherein the shaft planks and the screw pile connector planks are parallel and vertically aligned with each other, wherein one or more mounting plates are positioned at a length of the screw pile connector protrusions between the central cylindrical component and the screw pile connector planks, wherein one or more second mounting shaft plates directly connecting with the one or more mounting plates by one or more fasteners are positioned at a length of the screw pile connector protrusions between the cylindrical body and the shaft protrusions, wherein the one or more mounting plates are directly connected to and extend above the screw pile connector protrusions and the one or more mounting plates are directly connected to and extend below the shaft protrusions.

5. The screw pile base of claim 4, wherein the shaft has an upper component and lower component, wherein the upper component is wider than the lower component.

6. The screw pile base of claim 5, wherein the upper component and the lower component is separated by a middle plate that is wider than the upper component and the lower component.

7. The screw pile base of claim 6, wherein the shaft is positioned over an inner ring extending from a top of the screw pile connector.

* * * * *